(12) United States Patent
Shimizu et al.

(10) Patent No.: US 9,070,279 B2
(45) Date of Patent: *Jun. 30, 2015

(54) ELECTRONIC KEY REGISTRATION SYSTEM

(71) Applicant: KABUSHIKI KAISHA TOKAI RIKA DENKI SEISAKUSHO, Aichi (JP)

(72) Inventors: Takahiro Shimizu, Aichi (JP); Tetsuya Egawa, Aichi (JP); Akihito Kimura, Aichi (JP); Toshihiro Nagae, Aichi (JP); Daisuke Kawamura, Aichi (JP); Hiroaki Iwashita, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 96 days.

This patent is subject to a terminal disclaimer.

(21) Appl. No.: 13/863,469

(22) Filed: Apr. 16, 2013

(65) Prior Publication Data

US 2013/0285792 A1    Oct. 31, 2013

(30) Foreign Application Priority Data

Apr. 27, 2012 (JP) ................................ 2012-102668

(51) Int. Cl.
*G05B 19/00* (2006.01)
*H04Q 1/00* (2006.01)
*G06F 21/00* (2013.01)
*H04L 9/32* (2006.01)
*H04L 9/00* (2006.01)
*G08C 19/00* (2006.01)
*G07C 9/00* (2006.01)

(52) U.S. Cl.
CPC .............. *G08C 19/00* (2013.01); *H04L 9/3226* (2013.01); *G07C 9/00309* (2013.01); *G07C 9/00571* (2013.01); *G07C 9/00817* (2013.01); *G07C 2009/00825* (2013.01)

(58) Field of Classification Search
CPC ................. G07C 2009/00825; G07C 9/00309; G07C 9/00571; G07C 9/00817; G07C 9/00158; G08C 19/00; H04L 2463/081; H04L 63/0853; H04L 63/0869; H04L 63/0823; H04L 63/083; G08B 25/008; G08B 25/007; G08B 29/126; G08B 25/016; G08B 25/08; G06F 21/31; G06F 2221/2129
USPC ........ 340/5.6, 5.61, 5.64, 5.66, 5.7, 5.23, 5.1, 340/825.31, 825.56, 826.69, 426, 10.1, 5.3, 340/5.26, 5.8, 528, 541, 5.81; 713/186, 713/182, 184, 185, 168, 171; 726/4, 27; 380/44, 281, 278, 229
See application file for complete search history.

(56) References Cited

U.S. PATENT DOCUMENTS 6,018,697 A * 1/2000 Morimoto et al. ............ 701/411
7,831,827 B2 * 11/2010 Walmsley ..................... 713/168

(Continued)

FOREIGN PATENT DOCUMENTS

JP        07-061328       3/1995
JP        2004-107959     4/2004

*Primary Examiner* — Mirza Alam
(74) *Attorney, Agent, or Firm* — Greenblum & Bernstein, P.L.C.

(57) ABSTRACT

An electronic key registration system includes a controller arranged in a communication subject communicable with an electronic key. A registration tool is in wired or wireless connection with the communication subject. The registration tool registers the electronic key to the controller when receiving a registration permission signal. An information center is connected to a network. The registration tool includes an operator ID acquisition unit that acquires an operator ID from a key registration operator. A communication unit sends the operator ID to the information center through the network. The information center includes an operator ID verification unit that verifies the operator ID received from the registration tool. A permission information notification unit sends, when the operator ID is verified, a registration permission signal to the registration tool through the network to permit the registration tool to perform the registration process.

14 Claims, 6 Drawing Sheets

(56) References Cited

U.S. PATENT DOCUMENTS

| | | | |
|---|---|---|---|
| 2002/0180582 A1* | 12/2002 | Nielsen | 340/5.6 |
| 2008/0059806 A1* | 3/2008 | Kishida et al. | 713/186 |
| 2009/0178115 A1* | 7/2009 | Fiske | 726/2 |
| 2010/0333186 A1* | 12/2010 | Chan et al. | 726/10 |
| 2012/0090038 A1* | 4/2012 | Pacella et al. | 726/30 |

* cited by examiner

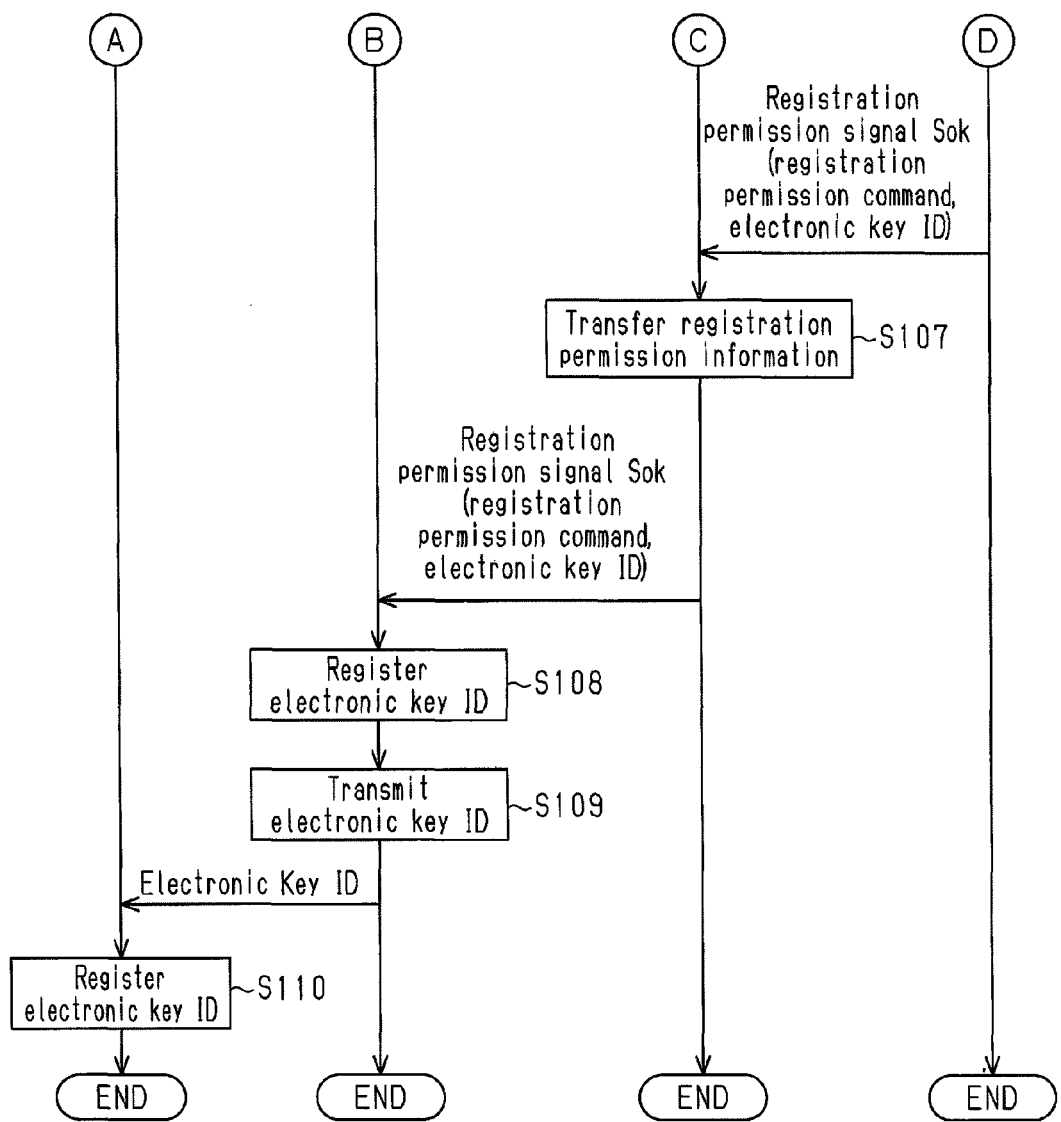

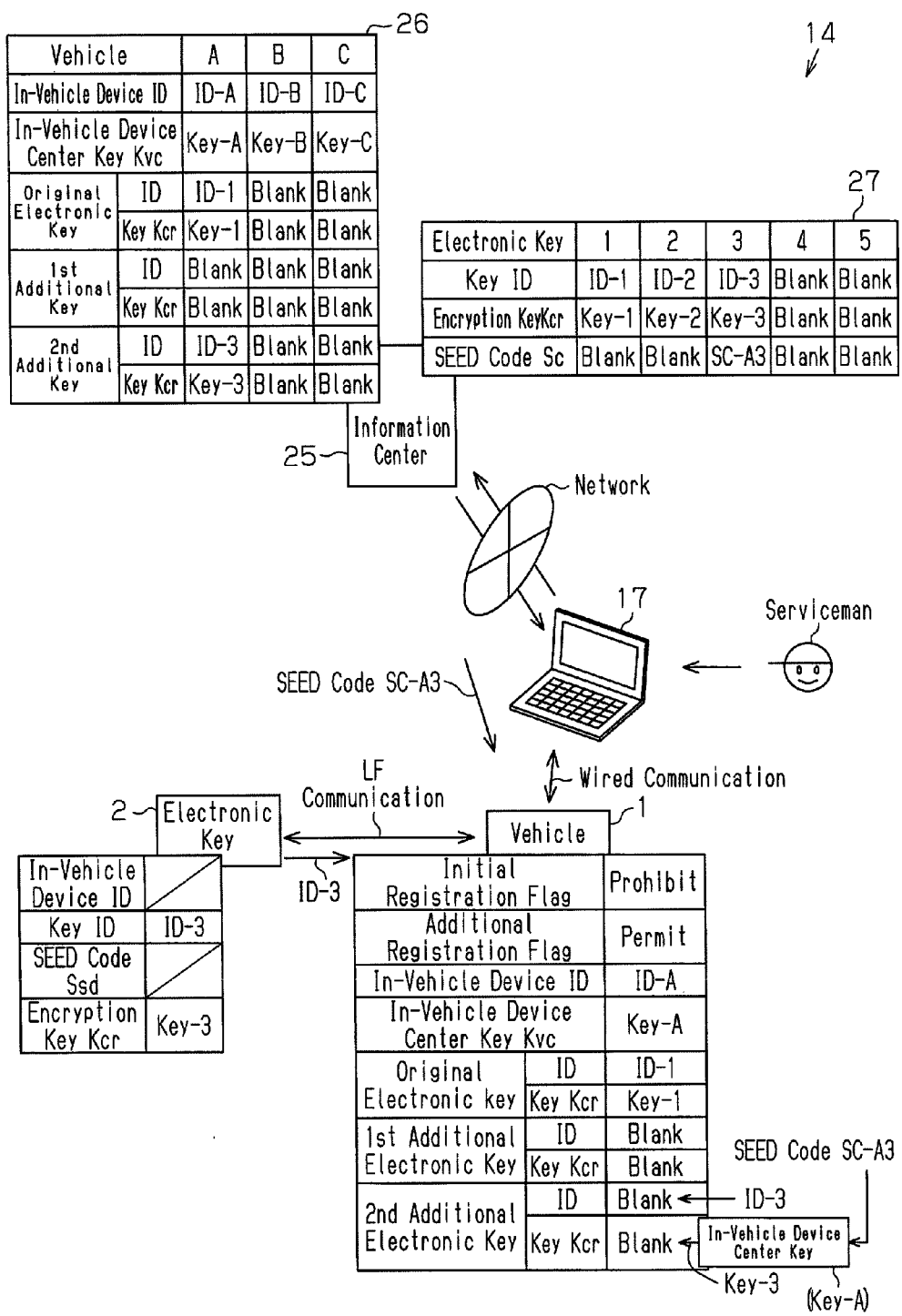

ELECTRONIC KEY REGISTRATION SYSTEM

CROSS-REFERENCE TO RELATED APPLICATIONS

This application is based upon and claims the benefit of priority from prior Japanese Patent Application No. 2012-102668, filed on Apr. 27, 2012, the entire contents of which are incorporated herein by reference.

BACKGROUND ART

The present invention relates to an electronic key registration system that registers an electronic key to a controller of a communication subject.

In an electronic key system for a vehicle, an electronic key transmits a key ID to an in-vehicle controller through a wireless connection. The in-vehicle controller performs ID verification. When ID verification is accomplished, the in-vehicle controller permits or performs the locking or unlocking of doors and the starting of the engine. In the electronic key system, the electronic key is registered in advance to the in-vehicle controller. Japanese Laid-Open Patent Publication Nos. 7-61328 and 2004-107959 describe examples of such an electronic key registration system.

SUMMARY

The inventors of the present invention have developed an online electronic key registration system that uses the Internet to register an electronic key to an in-vehicle controller. The electronic key registration system is provided with a registration tool including a communication circuit capable of accessing a network through wired or wireless connection. The user connects the registration tool to the vehicle with a wire. Then, the user operates the registration tool to access an information center through the network, and acquires information used for key registration from the information center to perform key registration. The inventors of the present invention have improved security for such an online electronic key registration system.

The present invention provides an electronic key registration system that improves security.

One aspect of the present invention is an electronic key registration system including a controller, a registration tool, and an information center connected to a network. The controller is arranged in a communication subject that is communicable with an electronic key. The registration tool is in wired or wireless connection with the communication subject and performs a registration process for registering the electronic key to the controller of the communication subject when receiving a registration permission signal. The registration tool includes an operator ID acquisition unit that acquires an operator ID from a key registration operator and a communication unit that sends the operator ID to the information center through the network. The information center includes an operator ID verification unit that verifies the operator ID received from the registration tool, and a permission information notification unit that sends, when the operator ID is verified, the registration permission signal to the registration tool through the network to permit the registration tool to perform the registration process.

Another aspect of the present invention is a method for registering an electronic key to a controller of a communication subject with a registration tool connected to an information center by a network. The method includes acquiring, with the registration tool, an operator ID assigned to a key registration operator; sending, by the registration tool, the operator ID to the information center through the network; verifying the operator ID at the information center; sending a registration permission signal from the information center to the registration tool through the network when the operation ID is verified; and performing, with the registration tool that receives the registration permission signal, a registration process to register the electronic key to the controller of the communication subject.

Further aspect of the present invention is a registration tool that registers an electronic key to a controller of a communication subject. The registration tool includes an operator ID acquisition unit that acquires an operator ID from a key registration operator; a communication unit that is communicable with an information center through a network and is configured to send the operator ID to the information center through the network and to receive a registration permission signal from the information center through the network; and a registration circuit that is in wired or wireless connection with the communication subject and is configured to perform a registration process for registering the electronic key to the controller of the communication subject when the communication unit receives the registration permission signal from the information center after the communication unit sending the operator ID.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 3A and 3B are a flowchart showing the registration procedures of an electronic key;

FIG. 6 is a block diagram showing another example of an electronic key registration system.

DETAILED DESCRIPTION OF EMBODIMENTS

An electronic key registration system according to one embodiment will now be described with reference to FIG. 1.

Figure 1:
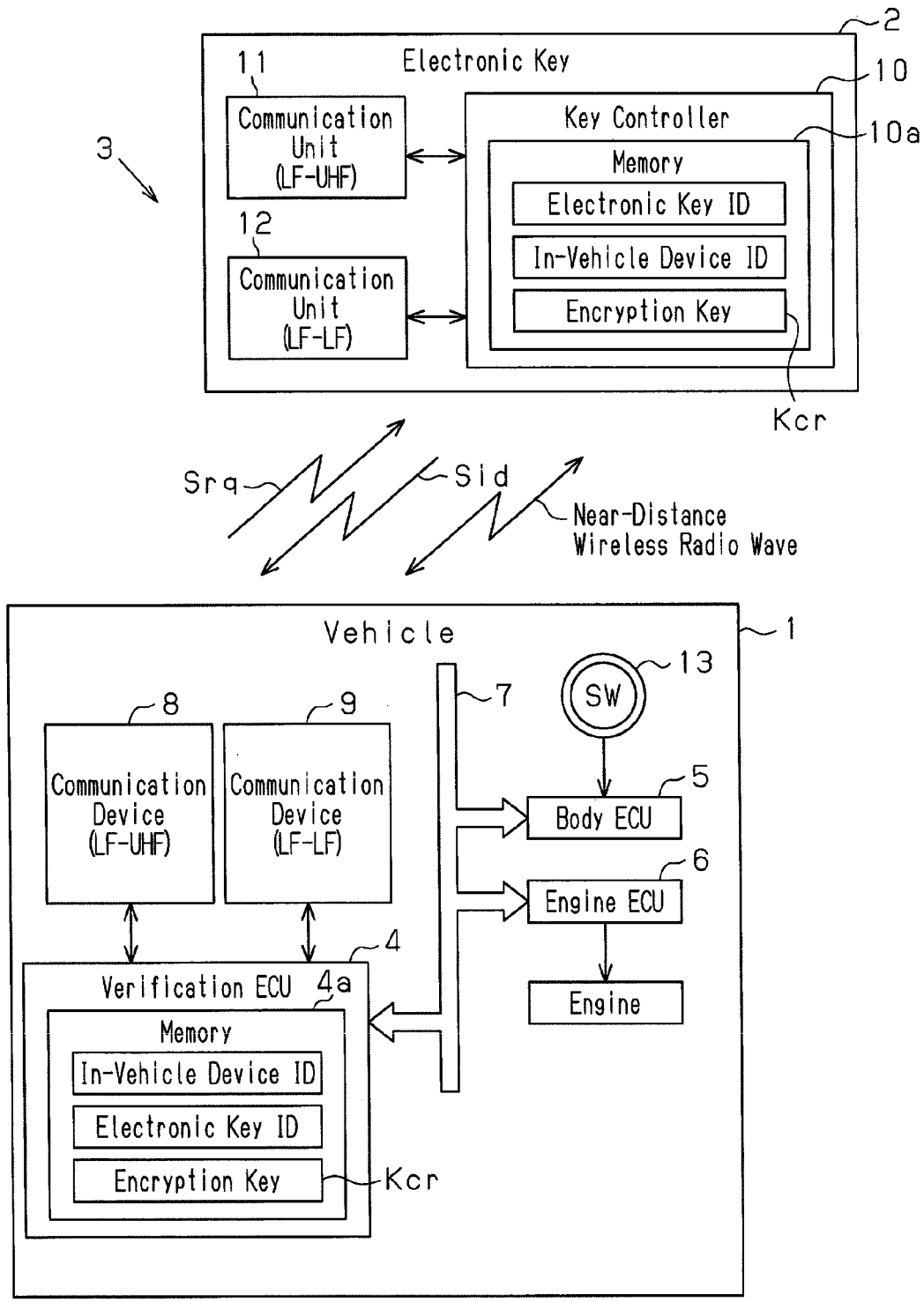
FIG. 1 is a block diagram of an electronic key system.
Figure 2:
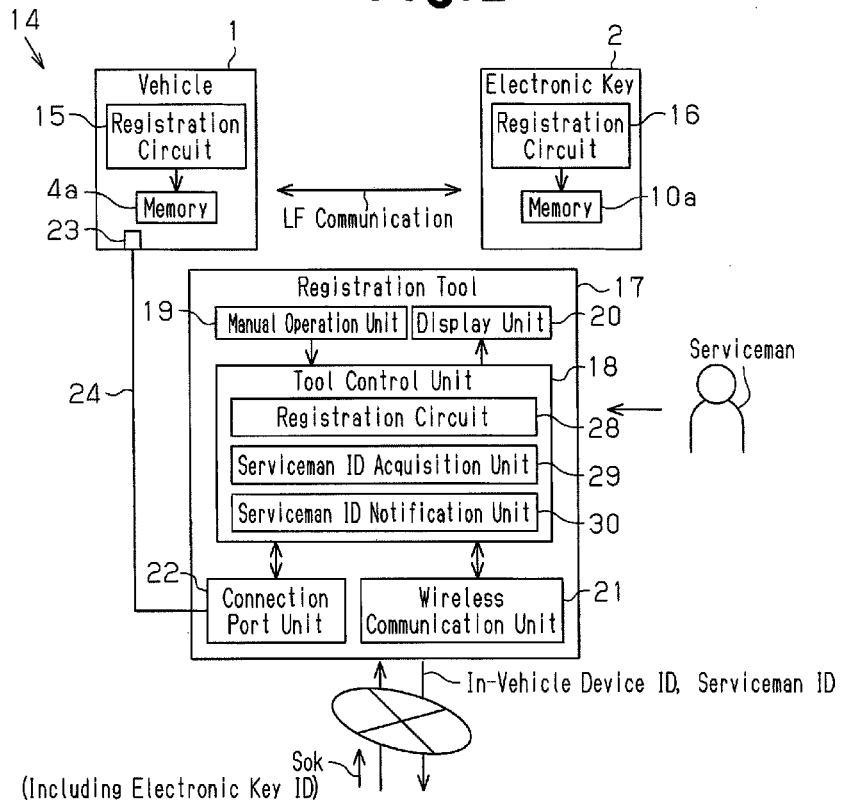
FIG. 2 is a block diagram of an electronic key registration system in one embodiment.

Referring to FIG. 1, an electronic key system 3 includes a verification electronic control unit (ECU) 4, which is arranged in a vehicle 1, and an electronic key 2, which includes an electronic key ID. The electronic key 2 receives a signal from the vehicle 1, and returns an electronic key ID in response. The electronic key system 3 verifies the electronic key 2 through bidirectional communication performed between the vehicle 1 and the electronic key 2. Any key may be used as the electronic key 2 as long as wireless communication may be performed. The electronic key system 3 is, for example, a key-free-operation system or an immobilizer system. The vehicle 1 is one example of a communication subject.

The verification ECU 4 receives and verifies an electronic key ID. The verification ECU 4 is connected to a bus 7 in the vehicle 1. A body ECU 5, which manages the power supplied to electronic components in the vehicle 1, and an engine ECU 6, which controls the engine, may be connected to the bus 7. The verification ECU 4 includes a memory 4a, which stores an in-vehicle device ID (vehicle ID) that is an ID unique to the vehicle 1, an electronic key ID of a registered electronic key, and an encryption key Kcr used for encrypted communication. The encryption key Kcr is associated with the electronic key ID. For example, when a plurality of electronic key IDs are registered to the vehicle 1, multiple sets of the electronic key IDs and the encryption key Kcr are stored in the memory 4a. The verification ECU 4 is connected to one or more communication devices. In the example of FIG. 1, a transceiver 8 for a key-free-operation system and a communication device 9 for an immobilizer system are used as the communication devices connected to the verification ECU 4. The transceiver 8 transmits and receives signals on a low frequency (LF) band and an ultrahigh frequency (UHF) band. The communication device 9 transmits and receives signals on the LF band. The communication device 8 may include a vehicle exterior transmitter and a vehicle interior transmitter. The verification ECU 4 is one example of a controller for a communication subject.

The electronic key 2 includes a key controller 10 that controls the operation of the electronic key 2. The key controller 10 includes a memory 10a that stores the electronic key ID, the in-vehicle device ID, and the encryption key Kcr. The key controller 10 includes a communication unit 11 for the key-free-operation system and a communication unit 12 for the immobilizer system.

The key-free-operation system will now be described. The communication device 8 may include a vehicle exterior transmitter and a vehicle interior transmitter. When the vehicle 1 is parked, the vehicle exterior transmitter of the communication device 8 transmits, for example, a request signal Srq on the LF band. The electronic key 2 receives the request signal Srq and returns an ID signal Sid. The verification ECU 4 performs ID verification (also referred to as vehicle exterior smart verification). The ID verification verifies the in-vehicle device ID and the electronic key ID. Preferably, the electronic key 2 and the verification ECU 4 perform encrypted communication using the encryption key Kcr. When vehicle exterior smart verification is accomplished, the verification ECU 4 permits or performs the unlocking or locking of the doors. When the electronic key 2 is located in the vehicle 1, the vehicle interior transmitter of the communication device 8 transmits a request signal Srq, and ID verification is performed in the vehicle 1 (vehicle interior smart verification) in the same manner as vehicle exterior smart verification. When vehicle interior smart verification is accomplished, the verification ECU 4 permits the starting of the engine. In this case, the engine ECU 6 starts the engine when an engine switch 13 is operated.

The immobilizer system will now be described. The vehicle 1 and the electronic key 2 perform bidirectional communication at a near distance (e.g., communication distance of several centimeters to approximately ten centimeters) to verify the electronic key ID. Such communication is referred to as immobilizer communication. During immobilizer communication, the electronic key 2 generates induced power from radio waves transmitted from the vehicle 1. The induced power drives the electronic key 2. This allows the electronic key 2 to perform immobilizer communication without a power supply. The near-distance wireless communication may be performed through, for example, transponder communication or near-field communication (NFC). Preferably, the near-distance wireless communication is encrypted communication that uses the encryption key Kcr.

The structure of the electronic key registration system 14 that registers the electronic key 2 to the vehicle 1 will now be described. The verification ECU 4 of the vehicle 1 and the key controller 10 of the electronic key 2 respectively include registration circuits 15 and 16 that perform key registration. The electronic key registration system 14 includes a registration tool that is in wired connection with the vehicle 1. The registration tool 17 is operated by a serviceman registering the electronic key 2 to the vehicle 1. The registration tool 17 registers the electronic key 2 to the vehicle 1 in accordance with the operation of the serviceman.

The registration tool 17 includes a tool control unit 18, a manual operation unit 19, and a display unit 20. The tool control unit 18 controls the operation of the registration tool 17 and may include various types of buttons for power, characters, and numbers. The registration tool 17 includes an interface that is connected to a network and the vehicle 1 in a communicable manner. In the illustrated example, the registration tool 17 includes a wireless communication unit 21, that performs network communication, and a connection port unit 22, that performs wired communication. The network communication may be, for example, Internet protocol (IP) communication. The connection port unit 22 of the registration tool 17 is in wired connection with the connection port unit 23 of the vehicle 1 through, for example, a cable 24. During key registration, the vehicle 1 and the electronic key 2 perform, for example, near-distance LF bidirectional communication.

The registration tool 17 communicates with an information center 25 through the network and performs on-line key registration. The information center 25 may be a vehicle information management center that manages various information and signals using the electronic key registration system 14.

The information center 25 includes an in-vehicle device database 26 and an electronic key database 27. The in-vehicle device database 26 stores the in-vehicle device ID and the electronic key ID for each vehicle 1. In the illustrated example, the in-vehicle device database 26 includes a line for vehicle information, a line for in-vehicle device IDs, a line for electronic key IDs, and a line for encryption keys. The line of electronic key IDs and the line for encryption keys are provided for each registered electronic key 2. The electronic key database 27 stores the electronic key ID and the encryption key Kcr for each electronic key 2. In the illustrated example, the electronic key database 27 includes the line of key IDs and the line of encryption keys for each electronic key 2. Whenever an electronic key 2 is registered, the information center 25 updates the in-vehicle device database 26 and the electronic key database 27.

Successful verification of the serviceman performing key registration is one condition relied upon for key registration by the electronic key registration system 14. For example, when registering the electronic key 2 to the vehicle 1, the registration tool 17 prompts the serviceman to input a serviceman ID (operator ID). When the serviceman ID is verified, the electronic key registration system permits key registration. This improves security for key registration.

The tool control unit 18 of the registration tool 17 may include a registration circuit 28, a serviceman ID acquisition unit 29, and a serviceman ID notification unit 30. The serviceman ID acquisition unit 29 acquires the serviceman ID from the serviceman. The serviceman ID notification unit 30 notifies the information center 25 of the acquired serviceman ID.

The information center 25 may include a serviceman ID database 31, an ID verification unit 32, and a registration permission signal notification unit 33. The serviceman ID database 31 stores a serviceman ID, assigned for each serviceman or each shop authorized to perform key registration, and the subject assigned with the serviceman ID. In the illustrated example, the serviceman ID database 31 includes a line of distributed ID location information and a line of serviceman IDs. Positional information (e.g., geographical information) of an authorized serviceman or an authorized shop may be registered to the distributed ID location information. The ID verification unit 32 verifies various IDs during key registration. For example, the ID verification unit 32 refers to the serviceman ID database 31 to verify the serviceman ID received from the registration tool 17. The ID verification unit 32 may also verify a registration location or determine whether or not the registration time is correct. When the ID verification unit 32 accomplishes verification, the registration permission signal notification unit 33 sends a registration permission signal Sok to the registration tool 17. A key registration permission instruction that permits the registration tool 17 to perform key registration and the electronic key ID that is to be registered may be included in the same registration permission signal Sok.

The operation of the electronic key registration system 14 will now be described.

Figure 3A:
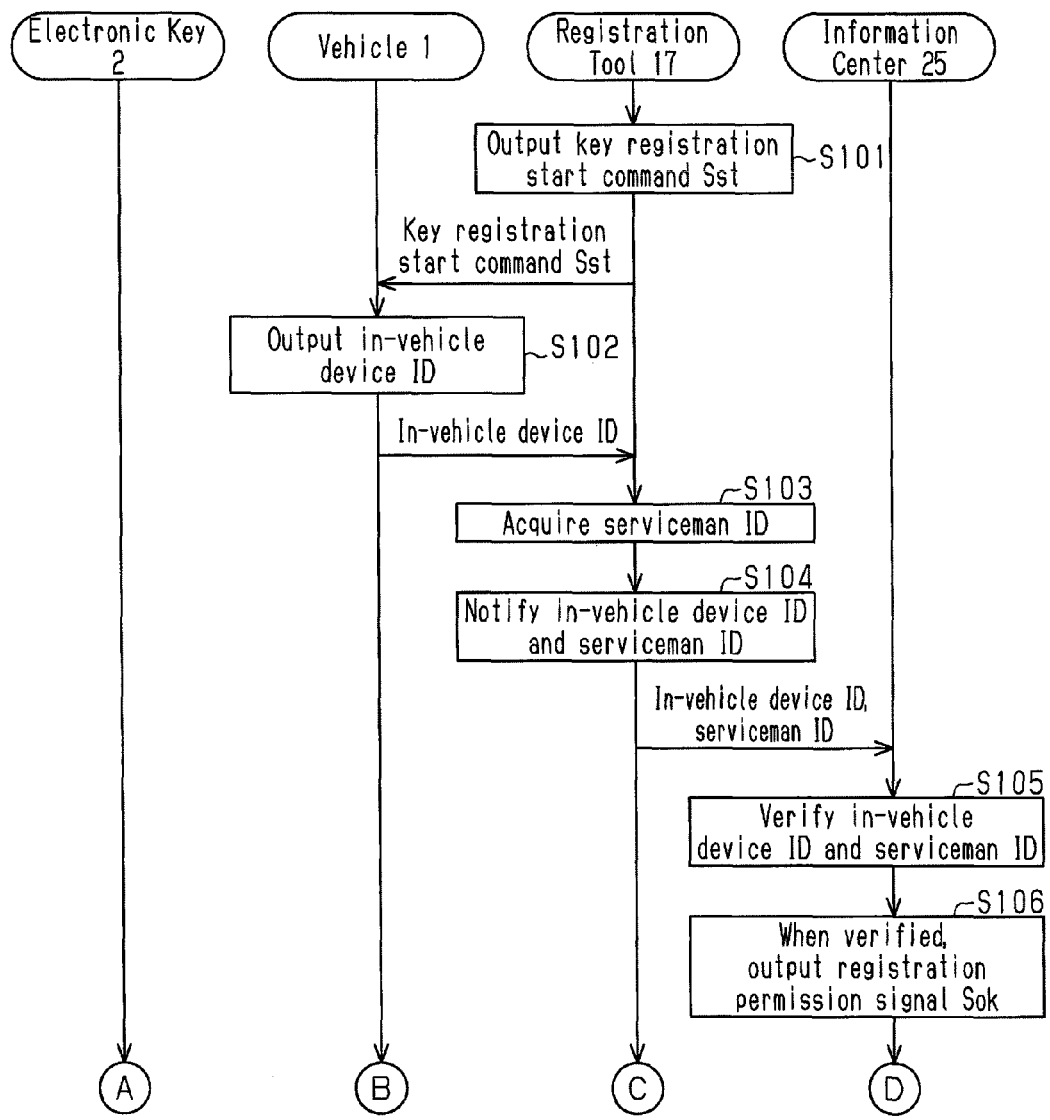

Referring to FIGS. 3A and 3B, in step S101, the registration circuit 28 of the registration tool 17 provides the vehicle 1 with a key registration start command Sst through wireless communication. For example, the registration circuit 28 shows an initial screen including a key registration start button on the display unit 20 of the registration tool 17. When the key registration start button is operated, the registration tool 17 sends a key registration start command Sst to the vehicle 1.

In step S102, in response to the key registration start command Sst from the registration tool 17, the registration circuit 15 provides the in-vehicle device ID stored in the verification ECU 4 to the registration tool 17 through wired communication.

In step S103, the registration tool 17 acquires the serviceman ID from the serviceman (operator ID acquisition step). For example, the serviceman ID acquisition unit 29 may show a serviceman ID input screen on the display unit 20. The information center 25 distributes the serviceman ID in advance to each serviceman or each store. In a preferred example, the serviceman ID is assigned and distributed beforehand in response to an ID distribution request sent to the information center 25 through the network or by telephone or facsimile. The serviceman manually operates the manual operation unit 19 while viewing the display unit 20 to input the serviceman ID to the tool control unit 18.

Figure 4:
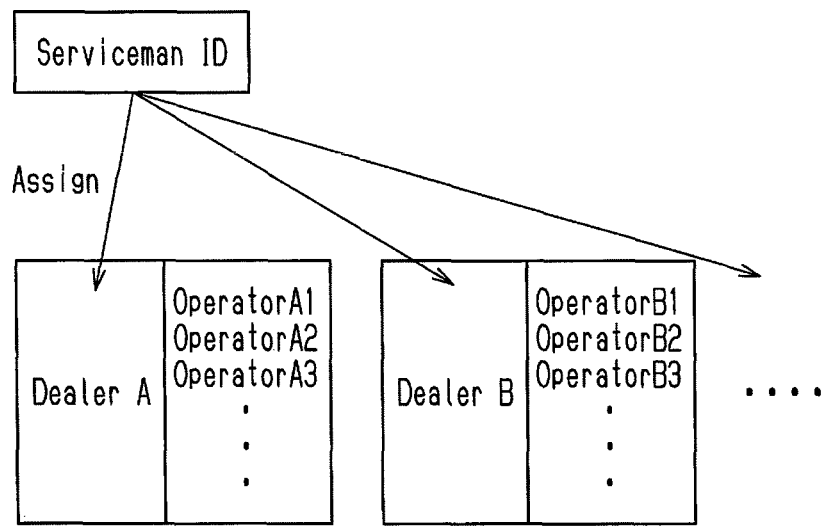
FIG. 4 is a diagram showing the assignment of a serviceman ID.
Figure 5:
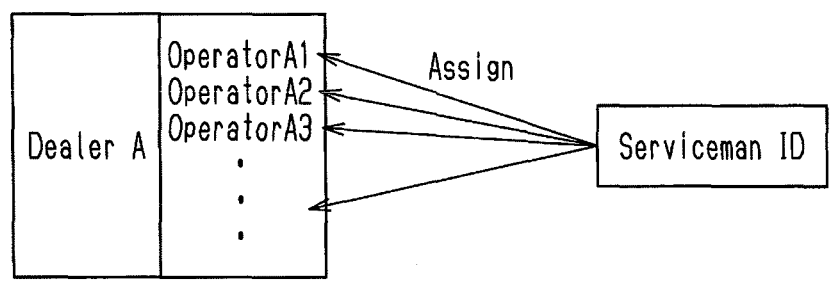
FIG. 5 is a diagram showing the assignment of the serviceman ID.

In the example shown in FIG. 4, the serviceman ID is assigned and distributed to each authorized shop such as a vehicle dealer. In the example shown in FIG. 5, the serviceman ID is assigned and distributed to each serviceman. In the example of FIG. 4, it is preferable that the serviceman ID be in safekeeping with the manager of the store. For example, it is preferable that the manager input the serviceman ID to the registration tool 17. Alternatively, the manager may notify the serviceman performing key registration of the serviceman ID. In the example of FIG. 5, each serviceman manages the assigned serviceman ID by himself or herself.

In step S104, the registration circuit 28 of the registration tool 17 sends the in-vehicle device ID, provided from the vehicle 1, and the serviceman ID, input by the serviceman, to the information center 25 through the network (operator ID transmission step).

In step S105, the information center 25 verifies the in-vehicle device ID and the serviceman ID acquired from the registration tool 17 (operator ID verification step). In this case, the ID verification unit 32 refers to the in-vehicle device database 26 to verify the received in-vehicle device ID (in-vehicle device ID verification). The ID verification unit 32 refers to the serviceman ID database 31 to verify the received serviceman ID (serviceman ID verification).

Preferably, the ID verification unit 32 verifies the location where key registration is performed (task location). For example, the ID verification unit 32 may check which network the serviceman ID was sent through to obtain positional information of the originating location of the serviceman ID, that is, specify the location (area) where key registration is performed. Preferably, when the received serviceman ID has been sent from a location that does not correspond to the registered distributed ID subject positional information in the serviceman ID database 31, the ID verification unit 32 presumes that the received serviceman ID is invalid and does not permit key registration.

Preferably, the ID verification unit 32 determines whether or not key registration is performed at the correct time (task time). For example, when key registration is performed outside normal business hours of a shop, the key registration is likely to be a wrongful act. Thus, when the key registration is performed outside business hours, the ID verification unit 32 presumes that the received serviceman ID is invalid and does not permit key registration.

The ID verification unit 32 may verify the validity of key registration based on multiple factors, such as the location and the time of key registration. For example, when a serviceman ID used for key registration in a shop located in a first geographical region (e.g., east coast region) is received immediately after (e.g., ten minutes after) the same serviceman ID is received from a second geographical region (e.g., west coast region) that is distant from the first geographical region, the ID verification unit 32 presumes that the serviceman ID is invalid and does not permit key registration. In this manner, preferably, the ID verification unit 32 verifies the validity of a key registration by checking multiple factors such as the time and location of the key registration.

In step S106, the registration permission signal notification unit 33 transmits a registration permission signal Sok through network communication to the registration tool 17 (key registration permission step) when ID verification has been accomplished in step S105. In addition to a registration permission command and an electronic key ID, the registration permission signal Sok may include the encryption key Kcr.

In step S107, the registration circuit 28 receives the registration permission signal Sok from the information center 25 through the network, and transfers the registration permission signal Sok to the vehicle 1.

In step S108, the registration circuit 15 of the vehicle 1 stores the electronic key ID (may also store the encryption key Kcr) in the registration permission signal Sok received from the registration tool 17. This completes the registration of the electronic key ID to the vehicle 1.

In step S109, the registration circuit 15 transmits the electronic key ID (may also transmit the encryption key Kcr) received from the registration tool 17 to the electronic key 2 through bidirectional LF communication.

In step S110, the registration circuit 16 of the electronic key 2 stores the electronic key ID (may also store the encryption key Kcr) received from the vehicle 1 in the memory 10a of the key controller 10. This completes the registration of the electronic key ID to the electronic key 2. That is, the registration of the electronic key ID to the vehicle 1 and the electronic key 2 is completed.

The present embodiment has the advantages described below.

(1) The registration tool 17 transmits the input serviceman ID to the information center 25 through network communication. The information center 25 verifies the serviceman ID. When the serviceman ID is verified, the information center 25 transmits the registration permission signal Sok to the registration tool 17 through the network and permits key registration with the registration tool 17. The conditions for performing key registration include the verification of the serviceman ID. Thus, when someone is in possession of the electronic key 2 and the registration tool 17 but does not know the serviceman ID, the key registration cannot be correctly completed. This reduces or obviates wrongful electronic key registration with the registration tool 17 and thereby improves the security of the electronic key registration system 14.

(2) When a serviceman ID is assigned to each shop like in the example of FIG. 4, the serviceman ID assigned to one shop cannot be used in another shop. This improves security during key registration.

(3) When a serviceman ID is assigned to each serviceman like in the example of FIG. 1, the serviceman ID assigned to one individual cannot be used or is difficult to use by another individual. This improves security during key registration.

(4) When the information center 25 verifies the serviceman ID, the information center 25 sends the registration permission signal Sok, which includes the registration permission command and the electronic key ID, to the registration tool 17 through the network. In this manner, the electronic key ID registered to the information center 25 is distributed from the information center 25 to the registration tool 17. This reduces compromising the security of the electronic key ID, and allows for secure registration of the electronic key ID to the vehicle 1 and the electronic key 2.

(5) The information center 25 verifies the serviceman ID and the location where key registration is performed. This improves security during key registration.

(6) The information center 25 verifies the serviceman ID and the time during which key registration is performed. This improves security during key registration.

It should be apparent to those skilled in the art that the present invention may be embodied in many other specific forms without departing from the spirit or scope of the invention. Particularly, it should be understood that the present invention may be embodied in the following forms.

FIG. 6 shows an example in which the information center 25 does not distribute an encryption key Kcr to the registration tool 17. Instead, the information center 25 distributes a SEED code SC generated to conceal an encryption key Kcr. The addition of the SEED code SC improves the security against theft of the encryption key Kcr.

In this example, the electronic key ID is registered beforehand in the electronic key 2. A line of in-vehicle device center keys that indicates an in-vehicle device center key Kvc registered to each vehicle is added to the in-vehicle device database 26 of the information center 25. The in-vehicle device center key Kvc is a dedicated key associated with the vehicle 1 (verification ECU 4) and the information center 25. A line of SEED codes that indicates the SEED code SC registered to each electronic key 2 is registered to the electronic key database 27 of the information center 25. The information center 25 generates the SEED code SC by performing a computation using the in-vehicle device center key Kvc corresponding to the encryption key Kcr.

In the example of FIG. 6, the verification ECU 4 of the vehicle 1 stores the IDs and keys listed under vehicle A in the in-vehicle device database 26. The verification ECU 4 of the vehicle 1 receives a key registration start command Sst for the electronic key 2 from the registration tool 17. Then, the verification ECU 4 receives, for example, an electronic key ID of "ID-3" from the electronic key 2 and stores the electronic key ID in the memory 4a. The verification ECU 4 transmits a SEED generation request to the information center 25 through the registration tool 17. In response to the SEED generation request, the information center 25 generates a SEED code of "SC-A3" corresponding to "ID-3" of the electronic key that is the registration subject. Here, the information center 25 selects "key-A" as the in-vehicle device center key Kvc corresponding to the vehicle A from the line of vehicle information in the in-vehicle device database 26. Then, the information center 25 uses the in-vehicle device center key Kvc of "key-A" and an encryption key of "key-3" corresponding to the additional electronic key to generate the SEED code of "SC-A3". The information center 25 sends the generated SEED code of "SC-A3" to the verification ECU 4 via the registration tool 17. The verification ECU 4 decodes the SEED code of "SC-A3" received from the information center 25 with the in-vehicle center key of "key-A" stored in the verification ECU 4 to generate the encryption key of "key-3" and stores the encryption key of "key-3" in the memory 4a. Further, the in-vehicle device ID of "ID-A" notified from the vehicle in the registration process is stored in the memory 4a.

When receiving the SEED generation request from the registration tool 17, the information center 25 recognizes the electronic key ID of the electronic key 2 that is to be registered. Thus, the information center 25 reflects the electronic key ID of "ID-3" for the electronic key 2 to the in-vehicle device database 26. Further, after sending the SEED code of "SC-A3" to the registration tool, the information center 25 reflects the encryption key of "key-3" for the registered electronic key 2 to the in-vehicle device database. The use of such a registration system also improves security after key registration.

New serviceman IDs may be registered to the information center 25 from time to time. Further, unnecessary serviceman IDs may be deleted from the information center 25.

The serviceman ID may be associated with regional information of where the ID is distributed. The ID verification unit 32 may use the regional information to verify the serviceman ID.

The information center 25 may store a registration tool ID associated with the serviceman ID. The ID verification unit 32 may verify the registration tool ID associated with the serviceman ID when verifying the serviceman ID.

The ID verification at the information center 25 only needs to include at least the serviceman ID.

The ID verification at the information center 25 may include verification based on whether or not the serviceman ID has expired.

A serviceman ID may be commonly assigned to more than one person in the same shop.

The network may be various types of wide-area wireless communication networks.

The controller is not limited to the verification ECU 4 and may be changed to other ECUs such as the body ECU 5.

The registration tool 17 may perform wireless communication with the vehicle 1.

One or both of the vehicle 1 and the electronic key 2 may directly communicate with the information center 25.

The serviceman ID may be configured by, for example, various numbers, characters, and marks. However, as long as the serviceman ID is information that allows the person performing key registration to be identified or an ID of the person performing key registration, the serviceman ID may be any type of data. For example, the serviceman ID may be biometric information, such as a fingerprint.

As long as the registration permission signal Sok includes at least a registration permission command, the registration permission signal Sok does not have to include an electronic key ID.

The operator may be any person that performs key registration, such as the owner of the vehicle 1.

The vehicle 1 or the electronic key 2 may directly communicate with the information center 25 to obtain the information used in a registration sequence.

The vehicle 1 may be a hybrid vehicle, a plug-in hybrid vehicle, an electric vehicle, a fuel cell vehicle, and the like.

The electronic key registration system 14 of the present example is applicable to a device or apparatus other than the vehicle 1.

The modifications described above may be combined.

It should be apparent to those skilled in the art that the present invention may be embodied in many other specific forms without departing from the spirit or scope of the invention. Particularly, it should be understood that the present invention may be embodied in the following forms.

The above embodiment and the modifications include the technical concept described below.

Technical Concept 1

The method according to claim 7 comprising:

acquiring a controller ID of the controller with the registration tool;

transferring the registration permission signal to the registration tool;

registering a key ID to the controller of the vehicle;

receiving the key ID from the vehicle with the electronic key; and registering the received key ID to the electronic key.

In technical concept 1, the key ID transferred to the vehicle is registered to the electronic key. This allows for registration of the key ID to the electronic key using, for example, an electronic key system of the vehicle.

The invention claimed is:

1. An electronic key registration system, comprising:
a controller arranged in a communication subject that is communicable with an electronic key;
a registration tool that is in wired or wireless connection with the communication subject and performs a registration process for registering the electronic key to the controller of the communication subject when receiving a registration permission signal; and
an information center connected to a network,
wherein the registration tool includes
an operator ID acquisition receiver that acquires an operator ID from a key registration operator, and
a communication transmitter that sends the operator ID to the information center through the network,
wherein the information center includes
an operator ID verification processor that verifies the operator ID received from the registration tool, and
a permission information notification transmitter that sends, when the operator ID is verified, the registration permission signal to the registration tool through the network to permit the registration tool to perform the registration process,
wherein the registration tool sends a key registration request signal including the operator ID to the information center, and
wherein the operator ID verification processor performs verification that includes verifying a geographical location of the registration tool that has transmitted the key registration request signal.

2. The electronic key registration system according to claim 1, wherein
the operator ID is one of a plurality of operator IDs, respectively assigned to shops that are authorized to perform key registration, and
the information center includes a database that stores the operator IDs in association with the shops and is configured to refer to the database to verify the operator ID received from the registration tool via the network.

3. The electronic key registration system according to claim 1, wherein
the operator ID is one of a plurality of operator IDs, each assigned to a different key registration operator, and
the information center includes a database that stores the operator IDs in association with the key registration operator and is configured to refer to the database to verify the operator ID received from the registration tool via the network.

4. The electronic key registration system according to claim 1,
wherein the registration permission signal includes a registration permission command, which permits the registration tool to perform key registration process, and a key ID, which is-stored in the information center.

5. The electronic key registration system according to claim 1, wherein
the registration tool sends a key registration request signal including the operator ID to the information center, and
the operator ID verification processor performs verification that includes determining whether or not the information center has received the key registration request signal at a correct time.

6. A method for registering an electronic key to a controller of a communication subject with a registration tool connected to an information center by a network, the method comprising:
acquiring, with the registration tool, an operator ID assigned to a key registration operator;
sending, by the registration tool, the operator ID to the information center through the network;
verifying the operator ID at the information center;
sending a registration permission signal from the information center to the registration tool through the network when the operator ID is verified; and
performing, with the registration tool that receives the registration permission signal, a registration process to register the electronic key to the controller of the communication subject,
wherein the sending the operator ID includes the registration tool sending a key registration request signal including the operator ID to the information center,
wherein the verifying the operator ID includes verifying a geographical location of the registration tool that has transmitted the key registration request signal,
wherein the registration tool is configured to receive a key ID from the information center and to register the key ID to the controller of the communication subject, and
wherein the controller of the communication subject is configured to transmit the key ID to the electronic key, wherein the electronic key is configured to register the key ID to a memory of the electronic key, and wherein the key ID is different from the operator ID.

7. The method according to claim 6,
wherein the operator ID is one of a plurality of operator IDs, respectively assigned to shops that are authorized to perform key registration, and wherein the verifying the operator ID at the information center includes referring to a database of the information center to verify the operator ID received from the registration tool via the network.

8. The method according to claim 6,
wherein the operator ID is one of a plurality of operator IDs, each assigned to a different key registration operator and wherein the verifying the operator ID at the information center includes referring to a database of the information center to verify the operator ID received from the registration tool via the network.

9. The method according to claim 6,
wherein the registration permission signal includes a registration permission command, which permits the registration tool to perform key registration process, and a key ID, which is stored in the information center.

10. The method according to claim 6, wherein
the sending the operator ID includes the registration tool sending a key registration request signal including the operator ID to the information center, and
the verifying the operator ID includes the information center determining whether or not the information center has received the key registration request signal at a correct time.

11. A registration tool that registers an electronic key to a controller of a communication subject, the registration tool comprising:
an operator ID acquisition receiver that acquires an operator ID from a key registration operator;
a communication transceiver that is communicable with an information center through a network, wherein the communication transceiver is configured to send the operator ID to the information center through the network and to receive a registration permission signal from the information center through the network; and
a registration system that includes a processor and that is in wired or wireless connection with the communication subject and is configured to perform a registration process for registering the electronic key to the controller of the communication subject when the communication transceiver receives the registration permission signal from the information center after the communication transceiver sending the operator ID, wherein the registration tool sends a key registration request signal including the operator ID to the information center, wherein operator ID verification processor performs verification that includes verifying a geographical location of the registration tool that has transmitted the key registration request signal, wherein the registration tool is configured to receive a key ID from the information center and to register the key ID to the controller of the communication subject, wherein the controller of the communication subject is configured to transmit the key ID to the electronic key, wherein the electronic key is configured to register the key ID to a memory of the electronic key, and wherein the key ID is different from the operator ID.

12. The electronic key registration system according to claim 1, further comprising:
an operator ID database and an in-vehicle device database,
wherein the operator ID verification processor of the information center is configured to refer to the operator ID database to verify the operator ID received from the registration tool via the network, and refer to the in-vehicle device database to verify an in-vehicle ID received from the registration tool via the network.

13. The electronic key registration system according to claim 1,
wherein the registering the electronic key to the controller of the communication subject includes registering a key ID to the controller by the registration tool and registering the key ID to electronic key by the controller of the communication subject, and
wherein the key ID is different from the operator ID.

14. The electronic key registration system according to claim 1,
wherein the registration tool is configured to receive a key ID from the information center and to register the key ID to the controller of the communication subject,
wherein the controller of the communication subject is configured to transmit the key ID to the electronic key,
wherein the electronic key is configured to register the key ID to a memory of the electronic key, and
wherein the key ID is different from the operator ID.

* * * * *

UNITED STATES PATENT AND TRADEMARK OFFICE
CERTIFICATE OF CORRECTION

| | | |
|---|---|---|
| PATENT NO. | : 9,070,279 B2 | Page 1 of 1 |
| APPLICATION NO. | : 13/863469 | |
| DATED | : June 30, 2015 | |
| INVENTOR(S) | : T. Shimizu et al. | |

It is certified that error appears in the above-identified patent and that said Letters Patent is hereby corrected as shown below:

In the claims,

Column 10, line 32 (claim 4, line 6) "is-stored" should be -- is stored --

Signed and Sealed this
First Day of December, 2015

Michelle K. Lee
*Director of the United States Patent and Trademark Office*